(12) United States Patent
Burra

(10) Patent No.: US 11,381,264 B2
(45) Date of Patent: Jul. 5, 2022

(54) SYSTEM-AWARE RF FRONT ENDS FOR WIRELESS COMMUNICATION SYSTEMS

(71) Applicant: Qorvo US, Inc., Greensboro, NC (US)

(72) Inventor: Gangadhar Burra, Fremont, CA (US)

(73) Assignee: QORVO US, INC., Greensboro, NC (US)

( * ) Notice: Subject to any disclaimer, the term of this patent is extended or adjusted under 35 U.S.C. 154(b) by 0 days.

(21) Appl. No.: 17/193,063

(22) Filed: Mar. 5, 2021

(65) Prior Publication Data

US 2021/0281283 A1 Sep. 9, 2021

Related U.S. Application Data

(60) Provisional application No. 62/985,386, filed on Mar. 5, 2020.

(51) Int. Cl.
*H04B 1/04* (2006.01)
*H04B 1/16* (2006.01)
*H04B 1/00* (2006.01)

(52) U.S. Cl.
CPC ......... *H04B 1/0475* (2013.01); *H04B 1/0458* (2013.01); *H04B 1/1607* (2013.01); *H04B 1/0028* (2013.01); *H04B 2001/0416* (2013.01)

(58) Field of Classification Search
CPC .. H04B 17/318; H04B 1/0028; H04B 1/0458; H04B 1/0475; H04B 1/1607; H04B 2001/0416
See application file for complete search history.

(56) References Cited

U.S. PATENT DOCUMENTS

| | | | | |
|---|---|---|---|---|
| 2002/0183013 A1* | 12/2002 | Auckland | ............ | H04B 1/0458 455/73 |
| 2012/0121041 A1* | 5/2012 | Volnhals | ............... | H04B 1/0003 375/316 |
| 2016/0037505 A1* | 2/2016 | Cooklev | ................. | H04W 8/20 370/329 |
| 2020/0106464 A1* | 4/2020 | Boyle | ....................... | H04L 5/06 |
| 2020/0225317 A1* | 7/2020 | Chen | ....................... | G01S 13/58 |

* cited by examiner

*Primary Examiner* — Khanh C Tran
(74) *Attorney, Agent, or Firm* — Withrow & Terranova, P.L.L.C.

(57) ABSTRACT

System-aware radio frequency (RF) front ends for wireless communication systems are provided. High complexity communication systems, such as Third Generation Partnership Project (3GPP) fifth generation (5G)-new radio (NR) systems, impose severe board area, volume, thermal and interference penalties on wireless devices. In the case of 5G-NR, this is due to the number of bands to be supported, the instantaneous bandwidth and spectral efficiency among other parameters. Other communications systems can involve high modulation of other parameters that similarly impose such penalties. Embodiments described herein provide a co-designed RF front end architecture that utilizes system knowledge (e.g., from baseband or other digital control circuitry, from antenna feedback, etc.) to dynamically adjust the parameters of various RF front-end components. System-aware RF front ends are thus able to improve and optimize performance criteria (e.g., to reduce the above penalties in complex communications systems).

20 Claims, 7 Drawing Sheets

SYSTEM-AWARE RF FRONT ENDS FOR WIRELESS COMMUNICATION SYSTEMS

RELATED APPLICATIONS

This application claims the benefit of provisional patent application Ser. No. 62/985,386, filed Mar. 5, 2020, the disclosure of which is hereby incorporated herein by reference in its entirety.

FIELD OF THE DISCLOSURE

The present disclosure is related to radio frequency (RF) front ends.

BACKGROUND

In traditional radio frequency (RF) communications systems, an RF front end includes receive (RX) and transmit (TX) chains as well as appropriate filters, switches, n-plexors, tuners, etc., which connect to an antenna or antenna sub-systems. The complexity of these RF front end chains is growing rapidly, irrespective of the applications at hand. For example, in automotive applications, the motivation of end manufacturers is to reduce the overall number of elements needed in order to miniaturize the form factor of RF transceiver and antenna devices (e.g., frequently deployed in a shark fin). Likewise, in fifth generation (5G) infrastructure, the motivation is to reduce thermal issues in both power amplifiers on the TX chain and low noise amplifiers on the RX chain.

FIG. 1 is a schematic block diagram of a traditional infrastructure remote radio unit (RRU) 10. The illustrated example is a 5G new radio (NR) communication system 12, with the RRU 10 connected via various back-haul units 14 to a central baseband unit 16. Historically, to avoid complex control protocols, the RRU 10 receives a very limited amount of control information from the central baseband unit 16. In particular, such control information is concentrated in layer 1 media access control (MAC)/physical layer (PHY) circuitry 18 and a transceiver device 20.

A traditional RF front end 22 receives, amplifies, and forwards RF TX and RX signals. Thus, the traditional RF front end 22 does not receive control information or have awareness of the other components of the 5G NR communication system 12. Thus, the control interface from either the central baseband unit 16 or the transceiver device 20 to the traditional RF front end 22 tends to be sparse at best. This does not allow for potential optimizations that are feasible with a complex communication system, such as 5G-NR.

SUMMARY

System-aware radio frequency (RF) front ends for wireless communication systems are provided. High complexity communication systems, such as Third Generation Partnership Project (3GPP) fifth generation (5G)-new radio (NR) systems, impose severe board area, volume, thermal and interference penalties on wireless devices. In the case of 5G-NR, this is due to the number of bands to be supported, the instantaneous bandwidth and spectral efficiency among other parameters. Other communications systems can involve high modulation of other parameters that similarly impose such penalties. Embodiments described herein provide a co-designed RF front end architecture that utilizes system knowledge (e.g., from baseband or other digital control circuitry, from antenna feedback, etc.) to dynamically adjust the parameters of various RF front-end components. System-aware RF front ends are thus able to improve and optimize performance criteria (e.g., to reduce the above penalties in complex communications systems).

An exemplary embodiment provides a system-aware RF front end. The system-aware RF front end includes a transmit (TX) node configured to receive an RF TX signal from a transceiver, a receive (RX) node configured to transmit an RF RX signal to the transceiver, and an antenna node configured to couple to an RF antenna. The system-aware RF front end further includes at least one RF power amplifier (PA) coupled between the TX node and the antenna node. The system-aware RF front end further includes at least one RF low noise amplifier (LNA) coupled between the RX node and the antenna node. The system-aware RF front end further includes a processor configured to receive meta information from control circuitry and process the meta information to determine a control scheme for the system-aware RF front end based on the meta information.

Another exemplary embodiment provides a method for controlling a RF front end using system information. The method includes receiving meta information for a wireless communication system from a plurality of data sources external to the RF front end. The method further includes processing, with a processor local to the RF front end, the meta information and determining a control scheme for the RF front end based on the processed meta information.

Another exemplary embodiment provides a RF device. The RF device includes RF system control circuitry and a transceiver configured to provide an RF TX signal from an upstream TX signal received from the RF system control circuitry and provide an upstream RX signal to the RF system control circuitry from an RF RX signal. The RF device further comprises a RF front end module coupled between the transceiver and an antenna, the RF front end module comprising a processor configured to receive meta information from the RF system control circuitry and process the meta information to determine a control scheme for the RF front end module based on the meta information.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
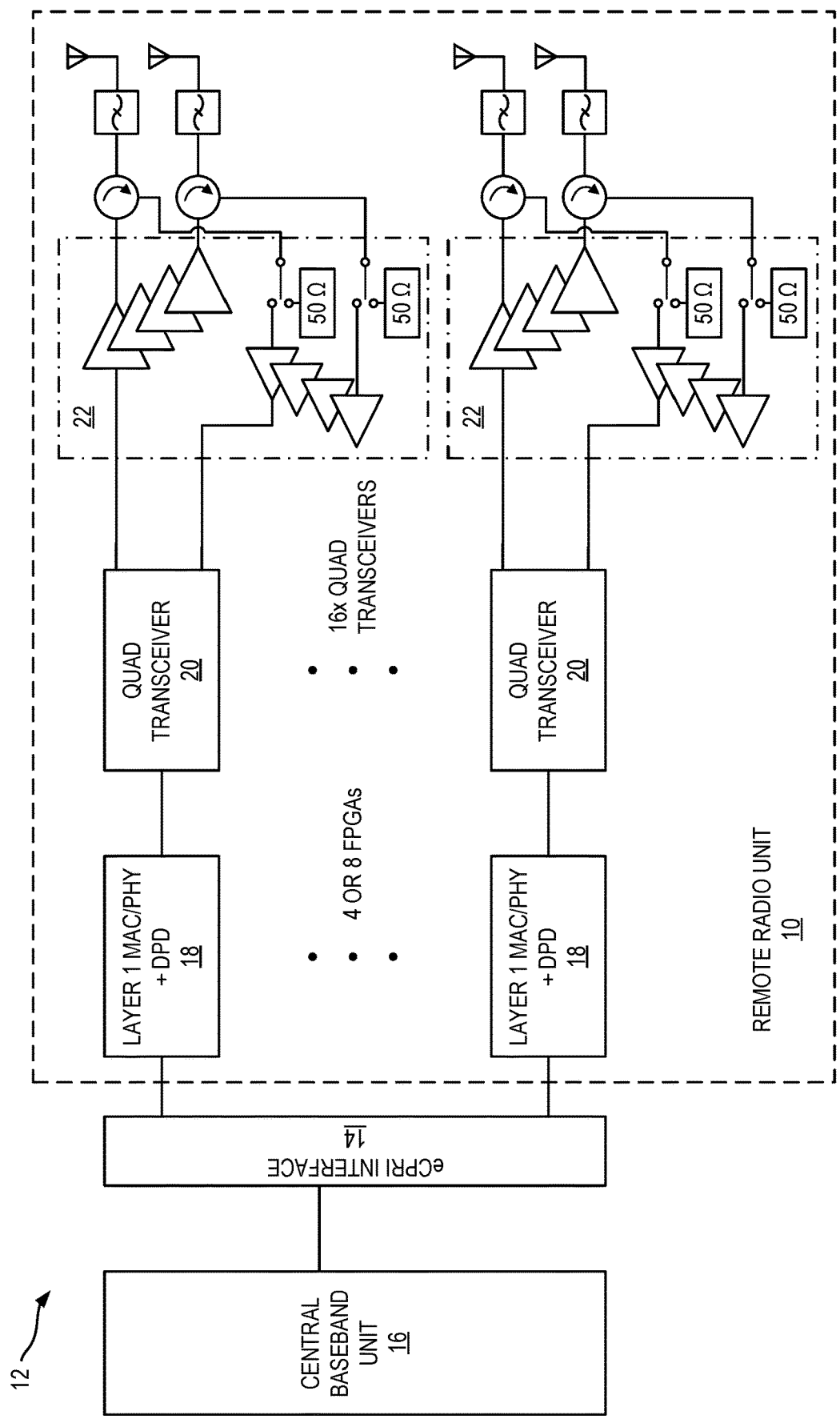
FIG. 1 is a schematic block diagram of a traditional infrastructure remote radio unit (RRU).

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

System-aware radio frequency (RF) front ends for wireless communication systems are provided. High complexity communication systems, such as Third Generation Partnership Project (3GPP) fifth generation (5G)-new radio (NR) systems, impose severe board area, volume, thermal and interference penalties on wireless devices. In the case of 5G-NR, this is due to the number of bands to be supported, the instantaneous bandwidth and spectral efficiency among other parameters. Other communications systems can involve high modulation of other parameters that similarly impose such penalties. Embodiments described herein provide a co-designed RF front end architecture that utilizes system knowledge (e.g., from baseband or other digital control circuitry, from antenna feedback, etc.) to dynamically adjust the parameters of various RF front-end components. System-aware RF front ends are thus able to improve and optimize performance criteria (e.g., to reduce the above penalties in complex communications systems).

Figure 2:
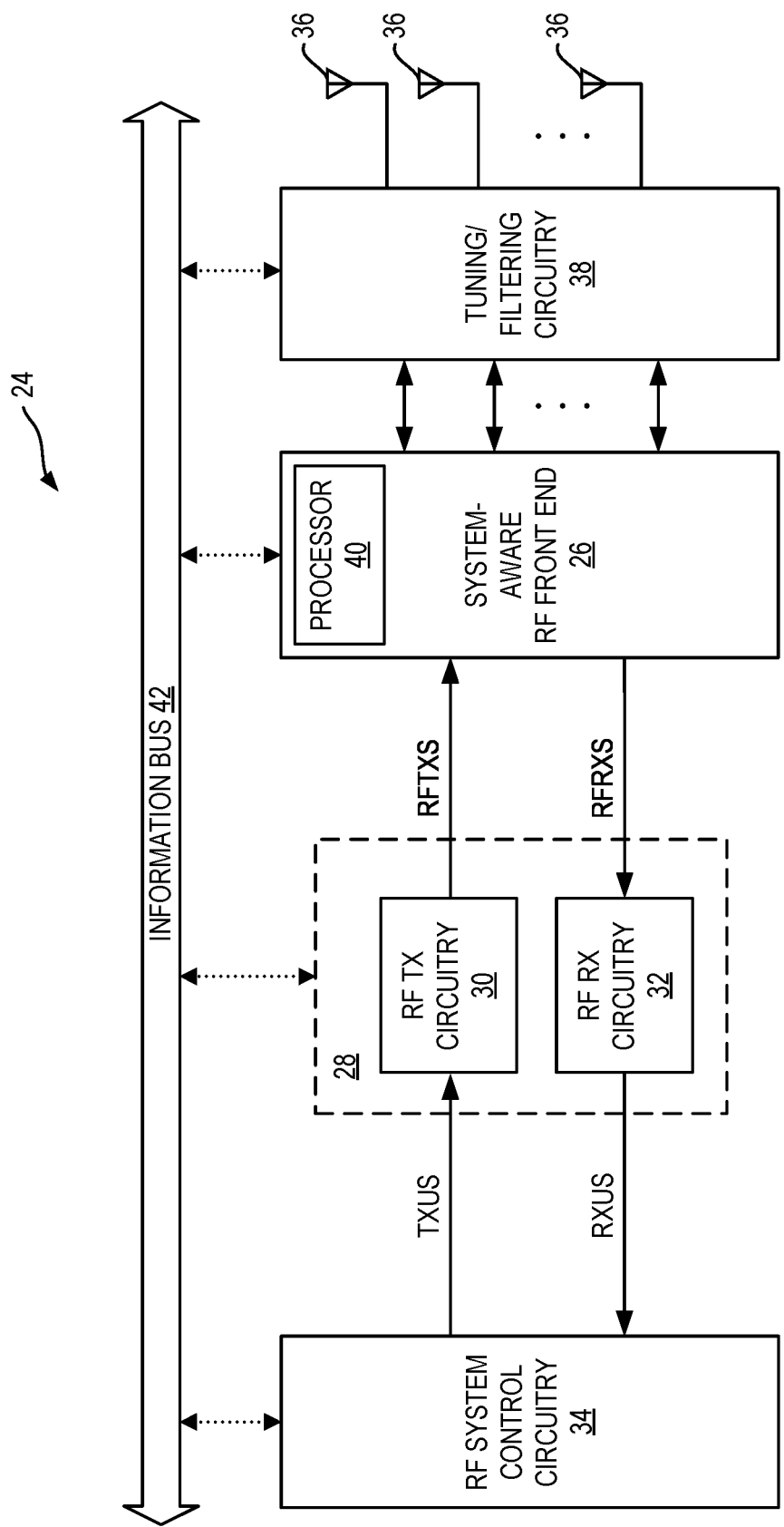
FIG. 2 is a schematic block diagram of a radio frequency (RF) device which includes a system-aware RF front end according to embodiments described herein.

FIG. 2 is a schematic block diagram of a RF device 24 which includes a system-aware RF front end 26 according to embodiments described herein. In an exemplary aspect, embodiments provide a system architecture that facilitates communication back and forth between digital baseband, transceiver, and RF sub-systems in order to achieve optimization in different metrics. Certain embodiments also use these parameters towards optimization of certain components of the system-aware RF front end 26.

In this regard, the RF device 24 includes a transceiver 28 with RF transmit (TX) circuitry 30 and RF receive (RX) circuitry 32 for sending and receiving RF signals. The transceiver 28 transmits and receives RF signals. In an exemplary aspect, RF system control circuitry 34 provides an upstream TX signal TXUS (e.g., a baseband signal) to the RF TX circuitry 30. The RF TX circuitry 30 processes the upstream TX signal TXUS to provide an RF TX signal RFTXS to be transmitted over one or more antennas 36. The RF TX circuitry 30 may include up-conversion circuitry, amplification circuitry, power supply circuitry, filtering circuitry, switching circuitry, combining circuitry, splitting circuitry, dividing circuitry, clocking circuitry, the like, or any combination thereof to process the upstream TX signal TXUS.

The RF RX circuitry 32 receives and processes an RF RX signal RFRXS from the one or more antennas 36 to provide an upstream RX signal RXUS (e.g., a baseband signal). The RF RX circuitry 32 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

The system-aware RF front end 26 receives, amplifies, and routes the RF TX signal RFTXS from the RF TX circuitry 30 to the one or more antennas 36. In addition, the system-aware RF front end 26 further receives, routes, and amplifies signals received via the one or more antennas 36 as the RF RX signal RFRXS to the RF RX circuitry 32. In some examples, additional circuitry, such as tuning and filtering circuitry 38, can be coupled between the system-aware RF front end 26 and the one or more antennas 36. In some embodiments, the tuning and filtering circuitry 38 is considered part of the system-aware RF front end 26.

In an exemplary aspect, the system-aware RF front end 26 includes a processor 40 which communicates with other components of the RF device 24 via an information bus 42. The information bus 42 can be an appropriate information bus for sending and receiving meta information and/or control information which extends beyond traditional control schemes. In an exemplary aspect, the system-aware RF front end 26 is an integrated circuit which includes the processor 40 (e.g., with associated memory and control circuitry), an RX chain, and a TX chain.

The processor 40 can receive and process one or more parameters in 5G-NR and other communications systems to better optimize operation of the system-aware RF front end 26. Examples of such parameters include, but are not limited to:

Variable sub-carrier spacing (e.g., varying between 15 and 240 kilohertz (kHz))
Symbol load tracking
Flexible frame structure
Dynamic modulation information
System quality of service (QoS) indication
Resource block (RB) indication (e.g., dynamic RB indication)
Signal quality indicator (SQI)
Beamforming codebook
Channel state matrix (e.g., multiple input multiple output (MIMO) matrix)

Each of the above parameters are high level parameters that are intended to be fed to a front-end system. The information bus 42 facilitates exchanging information between some or all of the RF system control circuitry 34 (which may provide baseband parameters and/or control information), the transceiver 28, the system-aware RF front end 26, and the tuning and filtering circuitry 38. The illustrated system architecture prevents overloading traditional interface structures.

Figure 3:
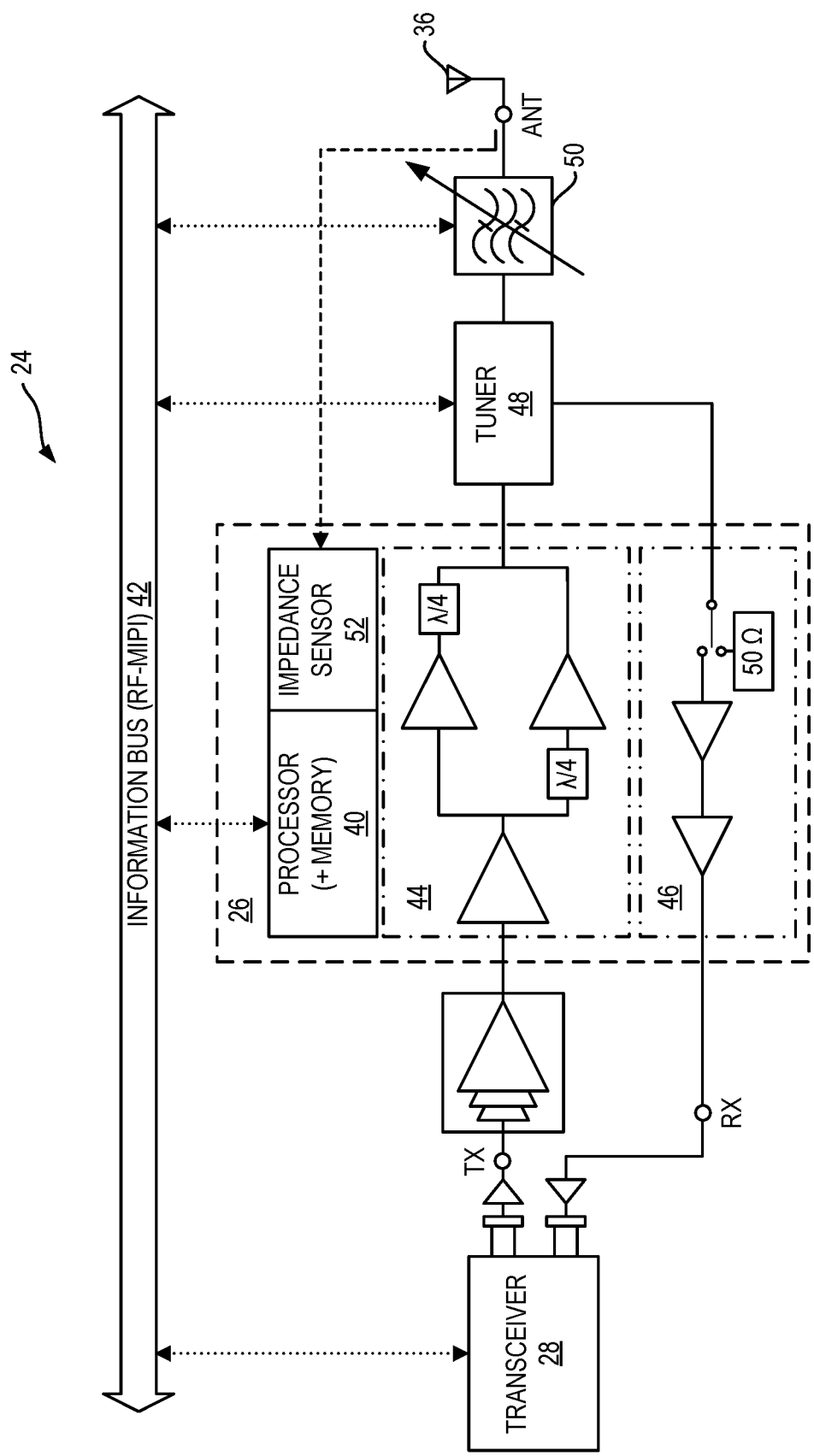
FIG. 3 is a schematic block diagram of the system-aware RF front end of FIG. 2 according to an exemplary aspect.

In further detail, FIG. 3 is a schematic block diagram of the system-aware RF front end 26 of FIG. 2 according to an exemplary aspect. The system-aware RF front end 26 may be deployed in any appropriate RF device 24, such as a user equipment (UE) or a remote radio unit (RRU) in a 5G-NR system, a WiFi device, a cellular phone, a computer, or any other device configured to communicate via an RF communications system.

The system-aware RF front end 26 includes a TX chain 44, which includes one or more RF power amplifiers (PAs) coupled between a TX node (TX, which is coupled to the transceiver 28) and an antenna node (ANT, which is coupled to an antenna 36). The TX chain 44 can include additional TX signal conditioning circuitry, such as filtering circuitry. The system-aware RF front end 26 further includes a RX chain 46, which includes one or more low noise amplifiers coupled between a RX node (RX, which is coupled to the transceiver 28) and the antenna node. The RX chain 46 can include additional RX signal conditioning circuitry, such as filtering circuitry.

The system-aware RF front end 26 can include or be coupled to a tuner 48 and one or more filters 50. In some examples, the tuner 48 may include a circulator, a diplexer, multiplexer, switching circuitry, etc., to facilitate coupling the TX chain 44 and the RX chain 46 to a common antenna 36.

In an exemplary aspect, the information bus 42 is a MIPI RF front end interface, which may be modified as further described herein. Through the information bus 42, the processor 40 (which includes a memory) can receive and process meta information from the transceiver 28, from baseband circuitry (not shown), from the tuner 48, or from the filters 50. The processor 40 then uses the meta information to determine a control scheme for the system-aware RF front end 26 (e.g., to adjust one or more parameters, such as an impedance in the TX chain 44 or the RX chain 46, an input power or gain of one or more RF PAs, phase adjustment circuitry, enabling or disabling one or more of an array of RF PAs, etc.).

As used herein, "meta information" refers to indirect information which can be relevant to the RF signals processed by the system-aware RF front end 26 (i.e., information other than the RF signals themselves). For example, the information bus 42 may provide the processor 40 with meta information regarding communication system conditions (e.g., radio conditions) received from the transceiver 28 or baseband circuitry in order to optimize performance of the system-aware RF front end 26. For example, the communication system condition can be an interference measurement, such as reference signal received power (RSRP), and the control scheme determined by the processor 40 can adjust an input power of one or more RF PAs to reduce interference (and/or conserve power when less interference is present). As another example, the processor 40 can be coupled to a sensor that can detect an output RF condition at the antenna node (e.g., an impedance sensor 52 sensing impedance at the antenna node, or a power detector, phase detector, etc.), which can be used to compensate for the output RF condition (e.g., perform dynamic impedance matching) in the system-aware RF front end 26.

The system-aware RF front end 26 architecture described herein allows for high level parameters to be available to both the TX chain 44 and the RX chain 46 in the form of parameters from both the digital baseband and observation parameters from the antenna. The incorporation of the processor 40 (e.g., a processing and storage engine, which can include a number of different processing and memory components as further described below with respect to FIG. 7) allows for self-standing and independent computations to be performed and control signals propagated effectively to the TX chain 44 and the RX chain 46.

Figure 4:
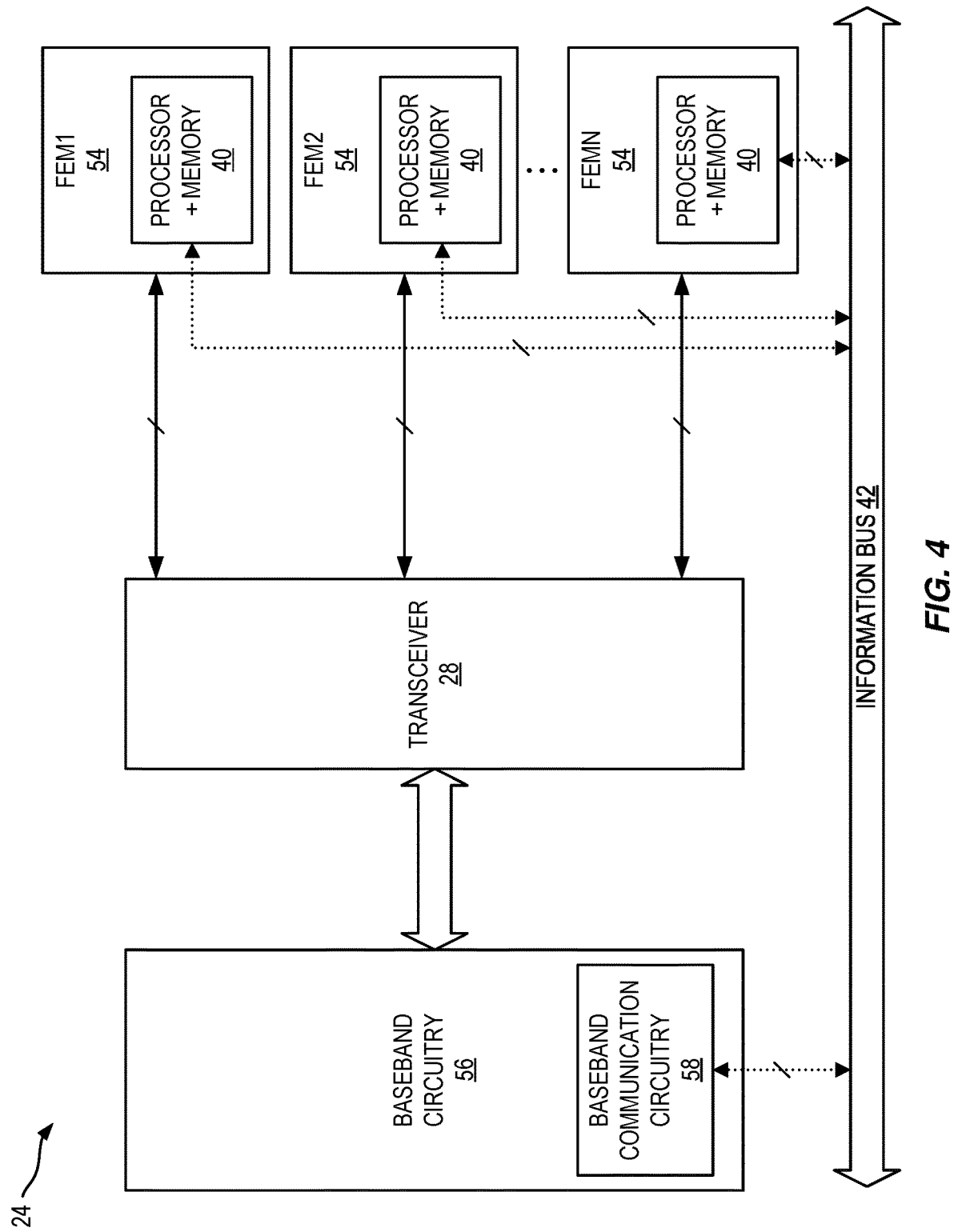
FIG. 4 is a schematic block diagram of a RF device with multiple RF front end modules according to another exemplary aspect.

Representative and non-exhaustive examples of the types of meta information that can be obtained, along with optimizations that can be made using different control schemes of the system-aware RF front end 26 are listed below:

Variable sub-carrier spacing (e.g., varying between 15 and 240 kHz)
PA linearity performance optimization; Filter transition regions may be relaxed
Symbol load tracking
Symbol based envelope tracking techniques for PA efficiency enhancement
Flexible frame structure
Potential adjacent channel leakage ratio (ACLR) relaxation based on dynamic frame information
Dynamic modulation information
Linearity relaxation in a dynamic fashion (and thus power consumption improvement)
System QoS indication
Bias and power optimization based on QoS for both receive and transmit links RB indication (e.g., dynamic RB indication)
  Allows for filter transition region relaxation and/or insertion loss optimization
SQI
  Power optimization on the receive side
  Likewise, power and linearity optimization on the transmit side of the link
Beamforming codebook
Channel state matrix (e.g., MIMO matrix)
  Dynamic adjustment of per chain power amplifier dynamics for overall RRU/UE optimization FIG. 4 is a schematic block diagram of a RF device 24 with multiple RF front end modules 54 according to another exemplary aspect. The RF device 24 may be a MIMO device which includes multiple RF front end modules 54, each having a corresponding antenna array. The RF device 24 includes baseband circuitry 56 (which may correspond to the RF system control circuitry 34 of FIG. 2), which can receive meta information from an upstream source in the RF communication system (e.g., a central baseband unit, a higher level application, etc.). The baseband circuitry 56 includes baseband communication circuitry 58 which provides the meta information to each of the RF front end modules 54 via the information bus 42.

In this regard, each RF front end module 54 includes a corresponding processor 40, which receives and processes the meta information. Each processor 40 then separately determines a control scheme which is appropriate to the signals and radio environment pertaining thereto. In some embodiments, the RF front end modules 54 may further exchange meta information with one another, such as information about the control scheme each is using, to further enhance performance of the RF device 24 overall.

Figure 5:
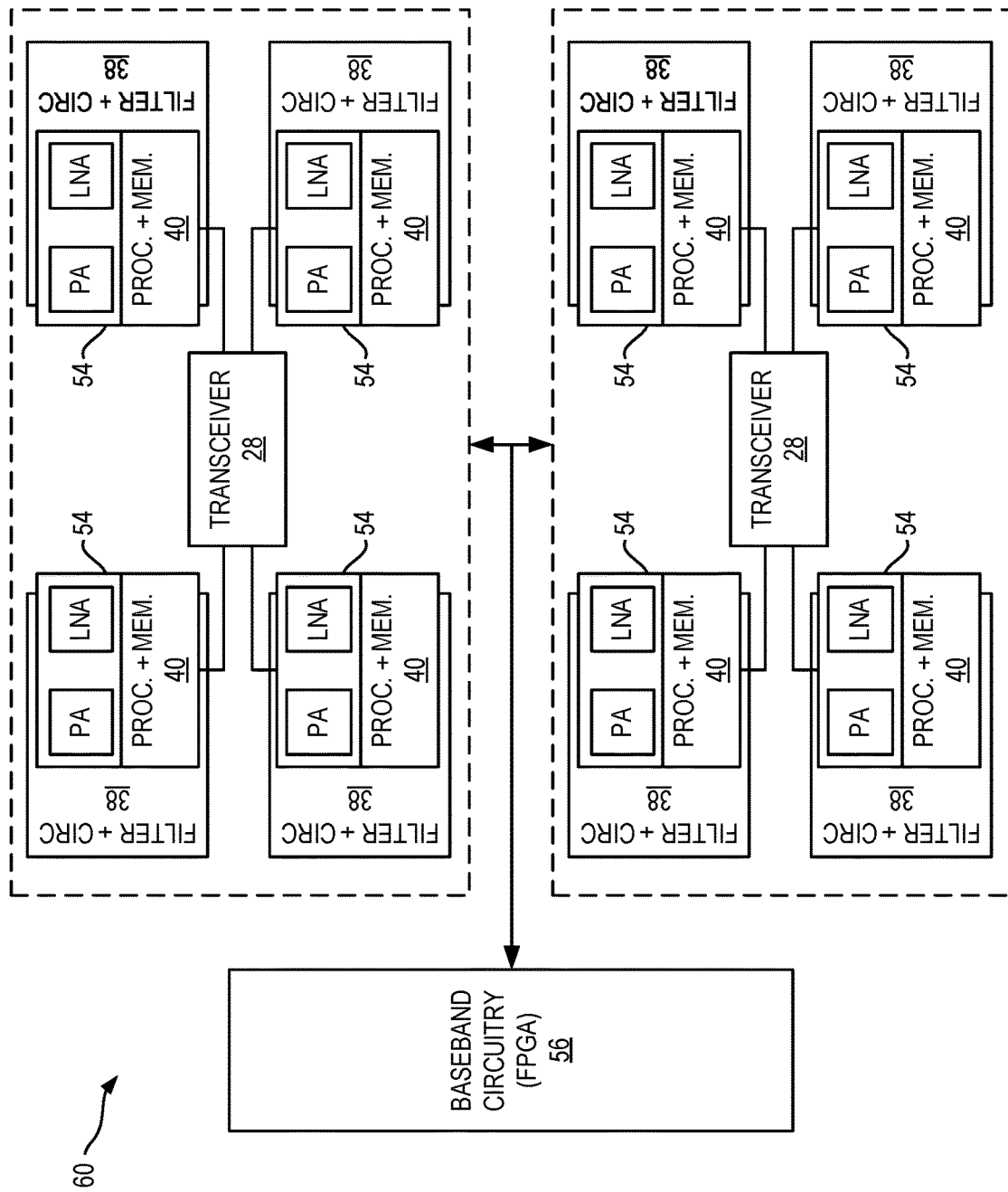
FIG. 5 is a schematic block diagram of a RRU according to another exemplary aspect.

FIG. 5 is a schematic block diagram of a RRU 60 according to another exemplary aspect. The RRU 60 includes multiple transceivers 28, each of which may in turn include multiple RF front end modules 54. As with the above embodiments, each of the RF front end modules 54 includes a corresponding processor 40 which provides system awareness to enhance performance.

Figure 6:
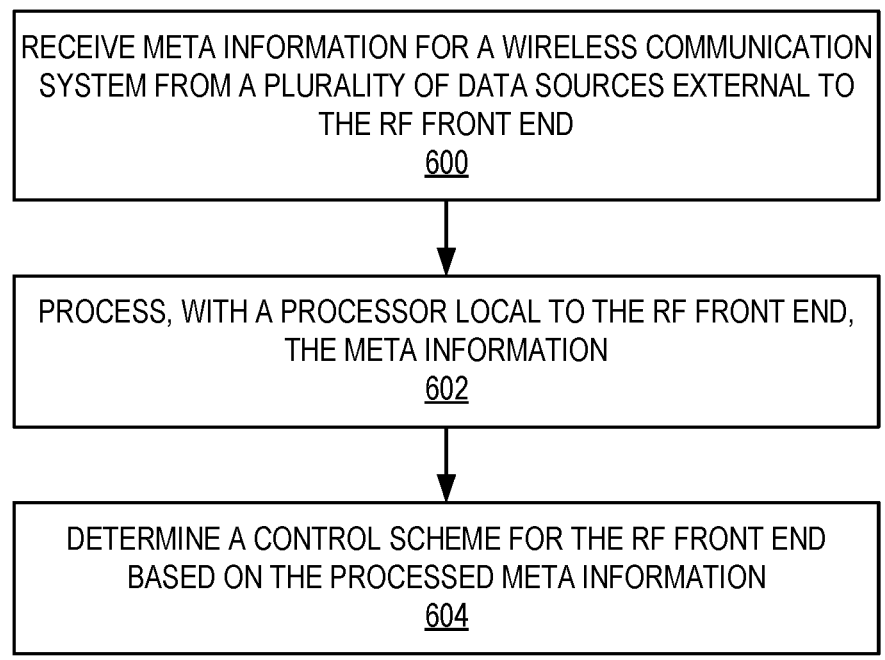
FIG. 6 is a flow diagram of a process for controlling a RF front end using system information.

FIG. 6 is a flow diagram illustrating a process for controlling a RF front end using system information. The process begins at operation 600, with receiving meta information for a wireless communication system from a plurality of data sources external to the RF front end. The process continues at operation 602, with processing, with a processor local to the RF front end (e.g., the processor 40 of FIG. 2), the meta information. The process continues at operation 604, with determining a control scheme for the RF front end based on the processed meta information.

Although the operations of FIG. 6 are illustrated in a series, this is for illustrative purposes and the operations are not necessarily order dependent. Some operations may be performed in a different order than that presented. Further, processes within the scope of this disclosure may include fewer or more steps than those illustrated in FIG. 6.

Figure 7:
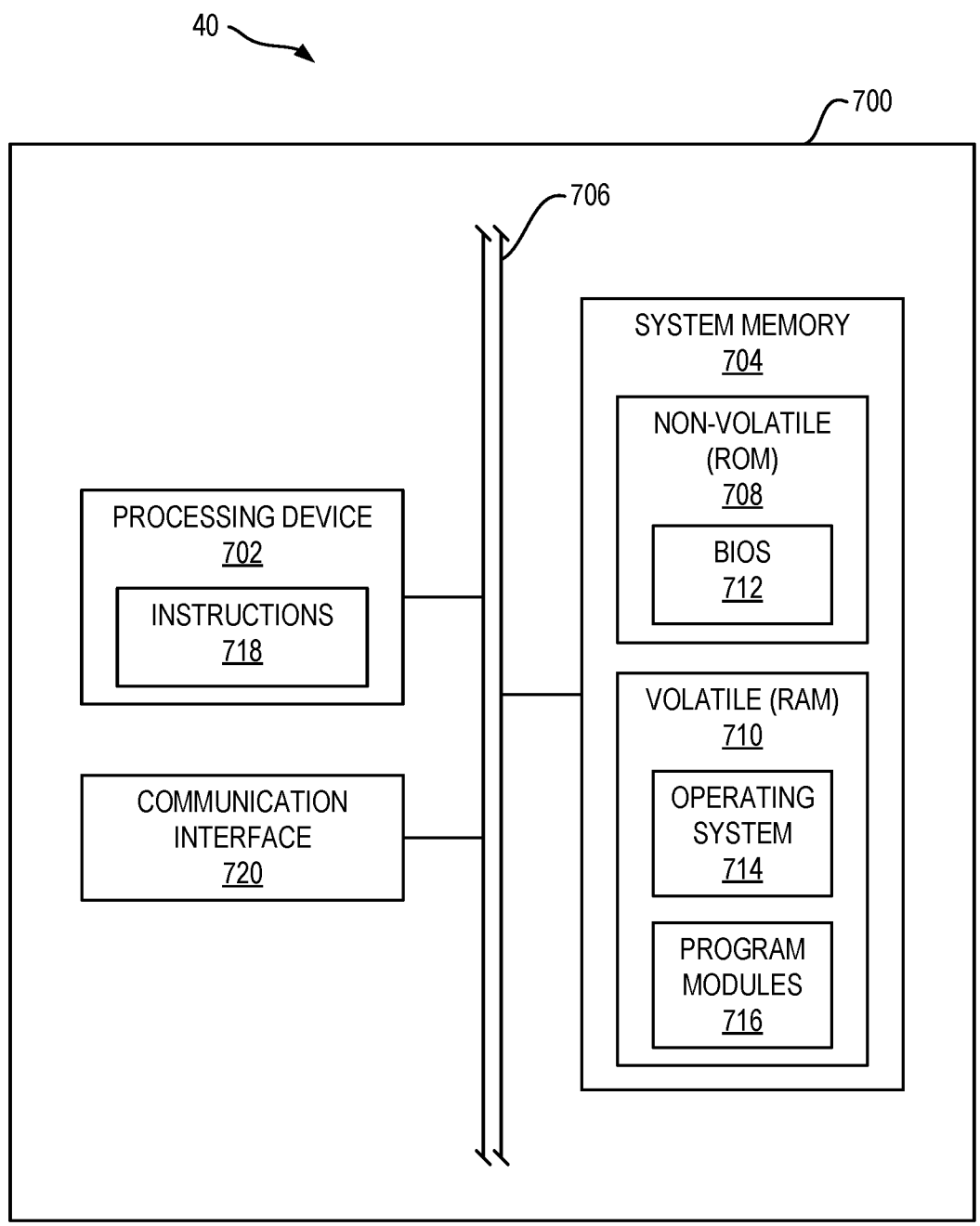
FIG. 7 is a block diagram of a processor suitable for controlling a RF front end according to embodiments disclosed herein.

FIG. 7 is a block diagram of a processor 40 suitable for controlling a RF front end according to embodiments disclosed herein. The processor 40 includes or is implemented as a computer system 700, which comprises any computing or electronic device capable of including firmware, hardware, and/or executing software instructions that could be used to perform any of the methods or functions described above, such as controlling a RF front end using system information (e.g., meta information). In this regard, the computer system 700 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 700 in this embodiment includes a processing device 702 or processor, a system memory 704, and a system bus 706. The system memory 704 may include non-volatile memory 708 and volatile memory 710. The non-volatile memory 708 may include read-only memory (ROM), erasable programmable read-only memory (EPROM), electrically erasable programmable read-only memory (EEPROM), and the like. The volatile memory 710 generally includes random-access memory (RAM) (e.g., dynamic random access memory (DRAM), such as synchronous DRAM (SDRAM)). A basic input/output system (BIOS) 712 may be stored in the non-volatile memory 708 and can include the basic routines that help to transfer information between elements within the computer system 700.

The system bus 706 provides an interface for system components including, but not limited to, the system memory 704 and the processing device 702. The system bus 706 may be any of several types of bus structures that may further interconnect to a memory bus (with or without a memory controller), a peripheral bus, and/or a local bus using any of a variety of commercially available bus architectures.

The processing device 702 represents one or more commercially available or proprietary general-purpose or application-specific processing devices, such as a microprocessor, central processing unit (CPU), an application-specific integrated circuit (ASIC) or the like. More particularly, the processing device 702 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 702 is configured to execute processing logic instructions for performing the operations and steps discussed herein.

In this regard, the various illustrative logical blocks, modules, and circuits described in connection with the embodiments disclosed herein may be implemented or performed with the processing device 702, which may be a microprocessor, field programmable gate array (FPGA), a digital signal processor (DSP), an ASIC, or other programmable logic device, a discrete gate or transistor logic, discrete hardware components, or any combination thereof designed to perform the functions described herein. Furthermore, the processing device 702 may be a microprocessor, or may be any conventional processor, controller, microcontroller, or state machine. The processing device 702 may also be implemented as a combination of computing devices (e.g., a combination of a DSP and a microprocessor, a plurality of microprocessors, one or more microprocessors in conjunction with a DSP core, or any other such configuration).

An operating system 714 and any number of program modules 716 or other applications can be stored in the volatile memory 710, wherein the program modules 716 represent a wide array of computer-executable instructions corresponding to programs, applications, functions, and the like that may implement the functionality described herein in whole or in part, such as through instructions 718 on the processing device 702. All or a portion of the functionality described herein may be implemented as a computer program product stored on a transitory or non-transitory computer-usable or computer-readable storage medium, such as the volatile memory 710, non-volatile memory 708, instructions 718, and the like. The computer program product includes complex programming instructions, such as complex computer-readable program code, to cause the processing device 702 to carry out the steps necessary to implement the functions described herein.

The computer system 700 may further include a communication interface 720. The communication interface 720 may facilitate communications with any number of devices, such as via the information bus 42. Additional inputs and outputs to the computer system 700 may be provided through the system bus 706 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A system-aware radio frequency (RF) front end, comprising:
    a transmit (TX) node configured to receive an RF TX signal from a transceiver;
    a receive (RX) node configured to transmit an RF RX signal to the transceiver;
    an antenna node configured to couple to an RF antenna;
    a sensor configured to couple to the RF antenna and detect an output RF condition;
    at least one RF power amplifier (PA) coupled between the TX node and the antenna node;
    at least one RF low noise amplifier (LNA) coupled between the RX node and the antenna node; and
    a processor configured to:
        receive meta information comprising a communication system condition from control circuitry, wherein the communication system condition comprises the output RF condition detected by the sensor; and
        process the meta information to determine a control scheme for the system-aware RF front end based on the meta information, wherein the control scheme compensates for the communication system condition.

2. The system-aware RF front end of claim 1, wherein the processor comprises a memory configured to store at least a portion of the meta information.

3. The system-aware RF front end of claim 1, wherein the processor comprises communication circuitry configured to couple to an information bus for receiving the meta information from the control circuitry and at least one of antenna circuitry or the transceiver.

4. The system-aware RF front end of claim 1, wherein the control circuitry is baseband circuitry coupled to the transceiver.

5. The system-aware RF front end of claim 1, wherein the control scheme causes the system-aware RF front end to adjust an impedance to match an impedance detected dynamically by the sensor.

6. The system-aware RF front end of claim 1, wherein:
    the communication system condition comprises an interference measurement; and
    the control scheme adjusts an input power of the at least one RF PA based on the interference measurement.

7. The system-aware RF front end of claim 1, wherein the meta information comprises at least one of sub-carrier spacing information, symbol tracking information, frame information, modulation information, resource block information, signal quality information, beamforming information, and channel state matrix information.

8. The system-aware RF front end of claim 7, wherein:
    the system-aware RF front end is configured for cellular communication operation; and
    the control scheme adjusts at least one of a RX chain or a TX chain in accordance with the meta information and the cellular communication operation.

9. The system-aware RF front end of claim 1, wherein the system-aware RF front end is an integrated circuit.

10. A method for controlling a radio frequency (RF) front end using system information, the method comprising:
    receiving meta information for a wireless communication system from a plurality of data sources external to the RF front end through an information bus;
    processing, with a processor local to the RF front end, the meta information; and
    determining a control scheme for the RF front end based on the processed meta information.

11. The method of claim 10, further comprising storing at least a portion of the meta information in a memory local to the RF front end.

12. The method of claim 10, wherein the control scheme controls parameters of at least one of a receive (RX) chain or a transmit (TX) chain in the RF front end.

13. The method of claim 12, further comprising:
    sensing an RF output condition at an RF antenna coupled to the RF front end; and
    compensating for the RF output condition at the RF antenna within the TX chain in the RF front end.

14. The method of claim 12, wherein:
    the meta information comprises a communication system condition; and
    the control scheme controls the parameters of at least one of the RX chain or the TX chain to compensate for the communication system condition.

15. The method of claim 14, wherein:
    the communication system condition comprises an interference measurement; and
    the control scheme adjusts an input power of at least one amplifier based on the interference measurement.

16. The method of claim 12, wherein:
    the RF front end is configured for fifth generation (5G)-new radio (NR) operation; and
    the control scheme controls the parameters of at least one of the RX chain or the TX chain in accordance with the meta information and 5G-NR operation.

17. A system-aware radio frequency (RF) front end, comprising:
    a transmit (TX) node configured to receive an RF TX signal from a transceiver;
    a receive (RX) node configured to transmit an RF RX signal to the transceiver;
    an antenna node configured to couple to an RF antenna;
    at least one RF power amplifier (PA) coupled between the TX node and the antenna node;
    at least one RF low noise amplifier (LNA) coupled between the RX node and the antenna node; and a processor configured to:
receive meta information from control circuitry, wherein the meta information comprises at least one of sub-carrier spacing information, symbol tracking information, frame information, modulation information, resource block information, signal quality information, beamforming information, and channel state matrix information; and
process the meta information to determine a control scheme for the system-aware RF front end based on the meta information.

18. The system-aware RF front end of claim 17, wherein:
the system-aware RF front end is configured for cellular communication operation; and
the control scheme adjusts at least one of a RX chain or a TX chain in accordance with the meta information and the cellular communication operation.

19. The system-aware RF front end of claim 17, wherein the processor comprises communication circuitry configured to couple to an information bus for receiving the meta information from the control circuitry and at least one of antenna circuitry or the transceiver.

20. The system-aware RF front end of claim 17, wherein:
the meta information comprises a communication system condition; and
the control scheme compensates for the communication system condition.

* * * * *